Nov. 26, 1935.    J. E. BOWMAN    2,022,337
AUTOMOBILE TIRE RIM
Filed Nov. 8, 1934    3 Sheets-Sheet 1
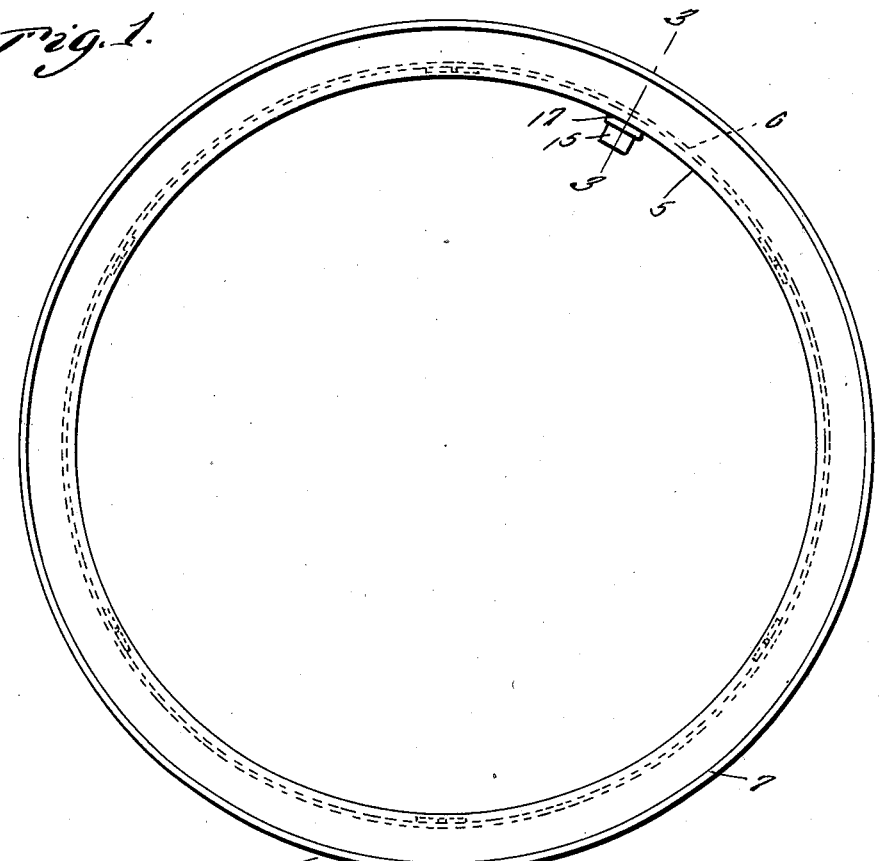
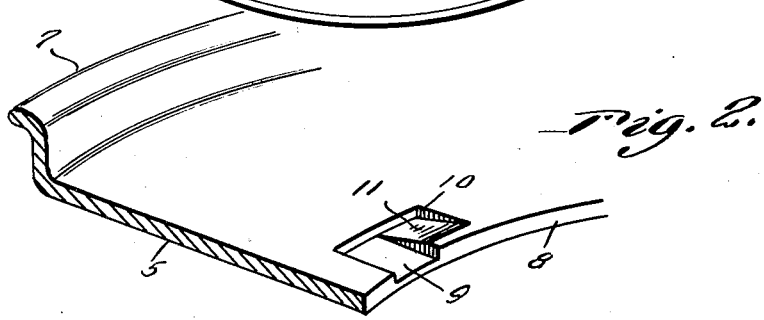
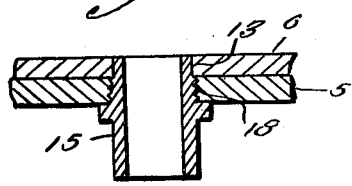
Inventor
John E. Bowman
By Clarence A. O'Brien
Attorney

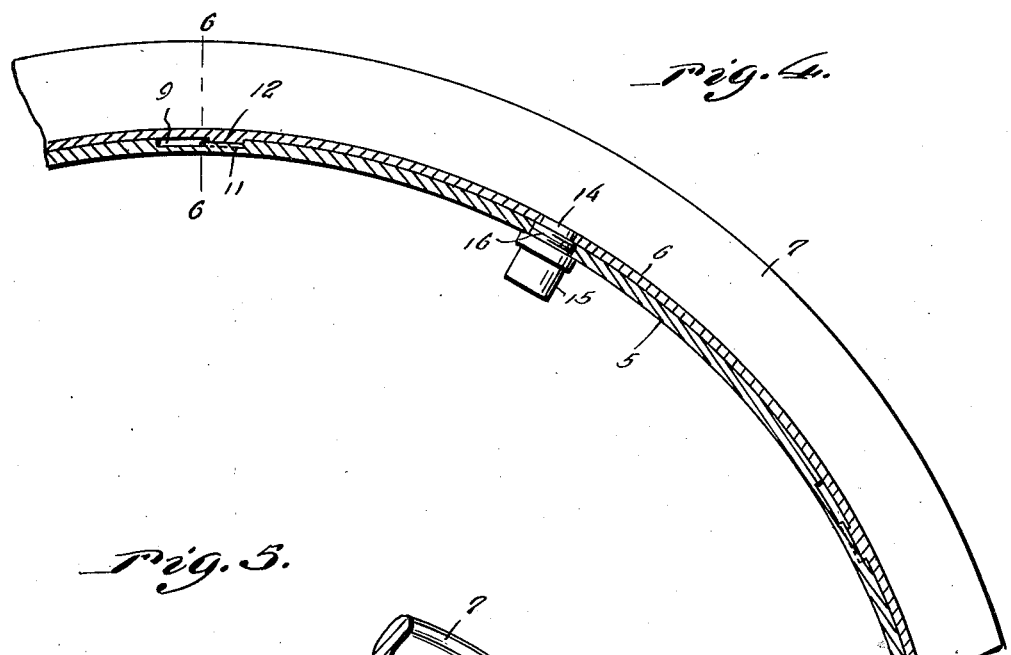
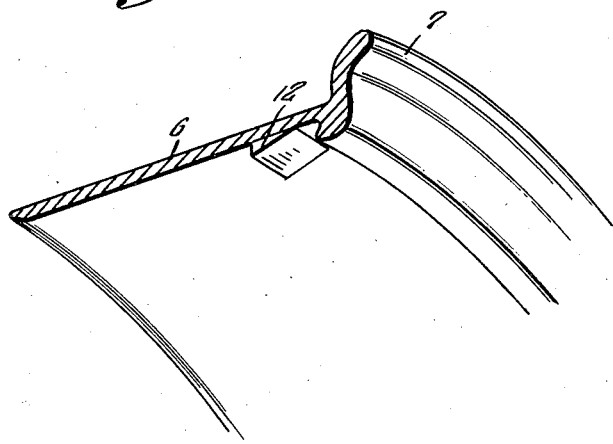
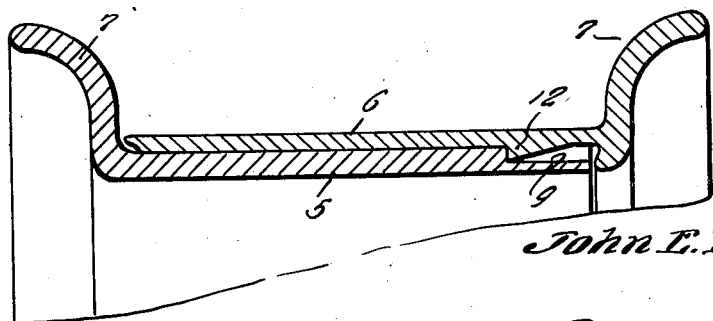

Nov. 26, 1935.   J. E. BOWMAN   2,022,337
AUTOMOBILE TIRE RIM
Filed Nov. 8, 1934   3 Sheets-Sheet 3
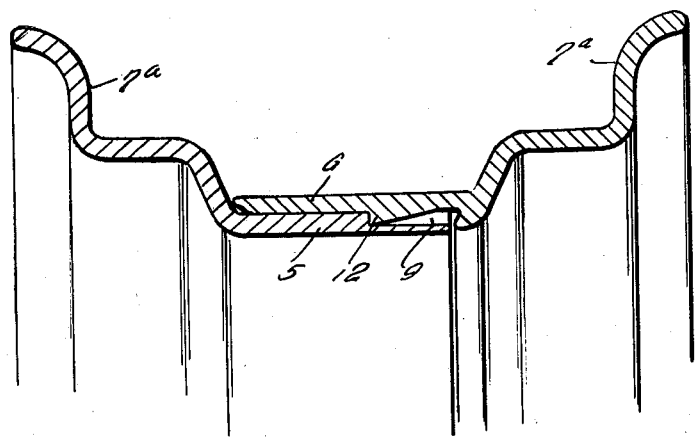
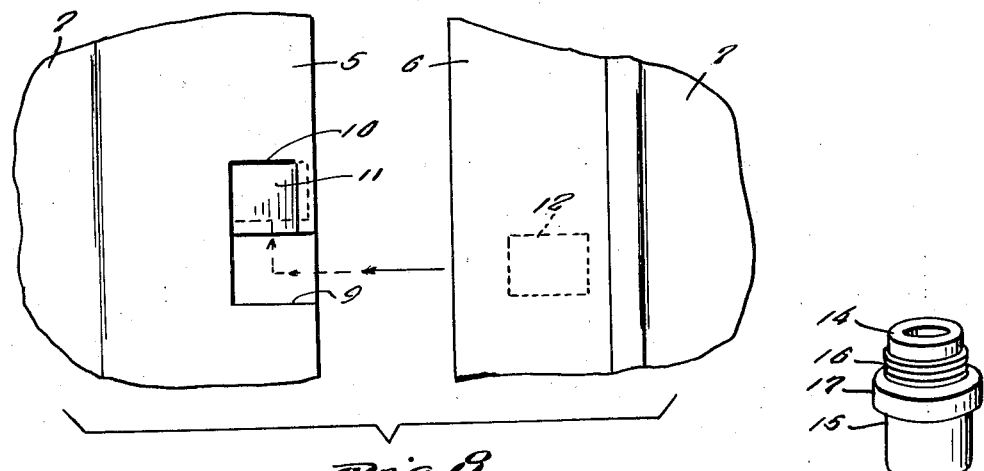
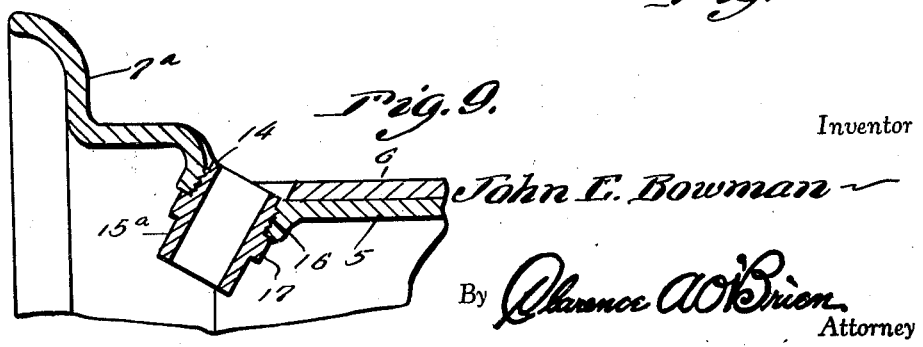
Inventor
John E. Bowman
By Clarence A. O'Brien
Attorney Patented Nov. 26, 1935

2,022,337

UNITED STATES PATENT OFFICE 2,022,337

AUTOMOBILE TIRE RIM

John Ervin Bowman, Buchanan, Mich.

Application November 8, 1934, Serial No. 752,127

1 Claim. (Cl. 301—35)

This invention appertains to new and useful improvements in rims for automobile pneumatic tires, and more particularly to a rim of the circumferentially divided type.

The principal object of the present invention is to provide a quick detachable pneumatic rim which involves means whereby it can be very quickly assembled or disassembled when required, and yet present a rim which when assembled will remain connected until human effort is employed to undo the same.

During the course of the following specification and claim, other important objects and advantages of the invention will become apparent to the reader.

In the drawings:—

Fig. 1 represents a side elevational view of the rim.

Fig. 2 represents a fragmentary perspective view of one section of the rim.

Fig. 3 represents a sectional view taken substantially on line 7—7 of Fig. 1.

Fig. 4 represents a fragmentary longitudinally sectional view through the rim.

Fig. 5 represents a fragmentary perspective view of the companion section to the section shown in Fig. 2.

Fig. 6 represents a cross sectional view taken substantially on line 6—6 of Fig. 4.

Fig. 7 represents a cross sectional view of a rim of the drop center type constructed in accordance with the present invention.

Fig. 8 represents a fragmentary side elevational view of the rim shown in Fig. 7 with the sections separated.

Fig. 9 represents a fragmentary detailed sectional view of the rim shown in Fig. 7.

Fig. 10 represents a perspective view of the valve stem bushing and sections detached.

Referring to the drawings wherein like numerals designate like parts, it can be seen in Figs. 1 to 6 inclusive that the rim consists of a pair of sections 5—6, each of these sections being provided with a circumferentially extending bead flange 7.

At predetermined intervals around the circumference of the section 5, this section is provided at its free edge 8 with a recess 9 which extends inwardly and communicates laterally with the recess 10 which does not extend through the edge 8 and which has an inclined bottom 11 inclining toward the edge 8 as clearly shown in Fig. 2.

On the other hand, the section 6 is provided on its bottom side adjacent the bead flange 7 with beveled protuberances 12 at predetermined spaced intervals around its circumference equal distances from each other to the distances between the recesses 10 on the section 5.

It can now be seen, that to assemble the rim, the sections 5—6 are disposed in overlapping position and rotated until the protuberances 12 match the recesses 9 whereupon the sections are pushed further together until the protuberances 12 are registering with the recesses 10 at which point the sections can be rotated a short distance in opposite directions until the protuberances are left in the recesses 10.

As can be seen in Fig. 3, to hold the sections in this secured position, the upper section 6 is provided with a smooth opening 13 therein for receiving the smooth extension 14 of the bushing 15 which has a thread washer 16 between the stop shoulder 17 and the said smooth extension 14, this threaded portion 16 being adapted to thread through the threaded bore 18 in the section 5 when this threaded bore is registering with the smooth opening 13 in the section 6, so that by driving the bushing through the opening 18, the smooth extension 14 can ride into the smooth opening 13 and thus lock the sections against opposite rotation.

The form of the invention shown in Figs. 7 and 9 is substantially the same excepting that the invention is embodied in the drop center type of rim wherein the tire flanges 7ª are slightly differently constructed to conform more with the construction of drop center rim. It may also be necessary to bring the bushing 15ª which corresponds to the bushing 15 in Fig. 3 obliquely from the rim in the manner shown in Fig. 9.

While the foregoing specification sets forth the invention in specific terms, it is to be understood that numerous changes in the shape, size and materials may be resorted to without departing from the spirit and scope of the invention as claimed hereinafter.

I claim:

In a pneumatic wheel, a circumferentially divided rim, the sections of said rim being provided with overlapping ring portions, one of said ring portions being provided with a plurality of depressions, each depression opening through the free longitudinal edge of the ring, beveled protuberances projecting inwardly from the other ring portion and adapted for snug engagement into the said depressions, the first mentioned ring portion being provided with a pocket adjacent each of the depressions and merging therewith, each of the said pockets provided with an inclined bottom extending from a high point at its outer end to a low point at its inner end and against which one of said protuberances can engage when one of the ring portions is rotated with respect to the other, and means for connecting the said ring portions to prevent circumferential motion thereof independent of each other.

JOHN ERVIN BOWMAN.